United States Patent
Chen et al.

(10) Patent No.: US 11,356,358 B2
(45) Date of Patent: Jun. 7, 2022

(54) NETWORK NODE, COMPUTER PROGRAM, COMPUTER-READABLE MEDIUM AND METHOD FOR FAIL-SAFE DATA TRANSMISSION

(71) Applicant: Siemens Aktiengesellschaft, Munich (DE)

(72) Inventors: Feng Chen, Feucht (DE); Franz-Josef Götz, Heideck (DE); Marcel Kießling, Bayern (DE); An Ninh Nguyen, Nuremberg (DE); Jürgen Schmitt, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/417,193

(22) PCT Filed: Jan. 23, 2019

(86) PCT No.: PCT/EP2019/051604
§ 371 (c)(1),
(2) Date: Jun. 22, 2021

(87) PCT Pub. No.: WO2020/151814
PCT Pub. Date: Jul. 30, 2020

(65) Prior Publication Data
US 2022/0045939 A1    Feb. 10, 2022

(51) Int. Cl.
*H04L 45/28* (2022.01)
*H04L 45/00* (2022.01)
(Continued)

(52) U.S. Cl.
CPC ............. *H04L 45/28* (2013.01); *G06N 7/005* (2013.01); *H04L 45/22* (2013.01); *H04L 45/42* (2013.01); *H04L 45/52* (2013.01)

(58) Field of Classification Search
CPC ......... H04L 45/28; H04L 45/22; H04L 45/42; H04L 45/52; G06N 7/005
See application file for complete search history.

(56) References Cited

U.S. PATENT DOCUMENTS

| | | | |
|---|---|---|---|
| 2002/0150099 A1* | 10/2002 | Pung | H04L 47/724 370/390 |
| 2007/0097892 A1* | 5/2007 | Tsang | H04L 47/783 370/310 |

(Continued)

FOREIGN PATENT DOCUMENTS

| | | |
|---|---|---|
| EP | 3035606 | 6/2016 |
| WO | 2018015425 | 1/2018 |
| WO | 2019001718 | 1/2019 |

OTHER PUBLICATIONS

International Search Report dated Oct. 25, 2019 based on PCT/EP2019/051604 filed Jan. 23, 2019.
Written Opinion based on PCT/EP2019/051604.

*Primary Examiner* — Khaled M Kassim
(74) *Attorney, Agent, or Firm* — Cozen O'Connor

(57) ABSTRACT

A network node, computer program, computer-readable medium and method for fail-safe data transmission in a network, in which data packets are transmitted from a sender to a receiver via redundant paths, upon which resources for the transmission are reserved at participating network nodes utilizing an identifier associated with the relevant path, wherein, if a new path is to be found for at least one of the paths involved, then the previous reservations on all redundant paths are maintained, a new redundant path is determined for the at least one path involved and an attempt is made to reserve resources for the transmission on this new redundant path at the participating network nodes, wherein a new identifier associated with the new path is utilized, and if the new reservations on the at least one new path are (Continued)

successful, then previous reservations on the at least one previous path involved are removed.

20 Claims, 8 Drawing Sheets

(51) Int. Cl.
*G06N 7/00* (2006.01)
*H04L 45/52* (2022.01)
*H04L 45/42* (2022.01)

(56) References Cited

U.S. PATENT DOCUMENTS

| | | | | |
|---|---|---|---|---|
| 2012/0314597 | A1* | 12/2012 | Singh | H04L 65/1069 |
| | | | | 370/252 |
| 2013/0339727 | A1* | 12/2013 | Paul | H04L 63/0428 |
| | | | | 713/153 |
| 2014/0355419 | A1* | 12/2014 | Pillai | H04L 41/0654 |
| | | | | 370/225 |
| 2015/0043383 | A1* | 2/2015 | Farkas | H04L 45/12 |
| | | | | 370/254 |
| 2015/0207671 | A1* | 7/2015 | Farkas | H04L 12/28 |
| | | | | 370/228 |
| 2015/0215200 | A1* | 7/2015 | Bottari | H04L 41/0681 |
| | | | | 370/228 |
| 2019/0036717 | A1* | 1/2019 | Kebler | H04L 12/185 |
| 2019/0342944 | A1* | 11/2019 | Chatterjee | H04W 72/044 |
| 2020/0314004 | A1* | 10/2020 | Rashad | H04L 45/74 |

* cited by examiner

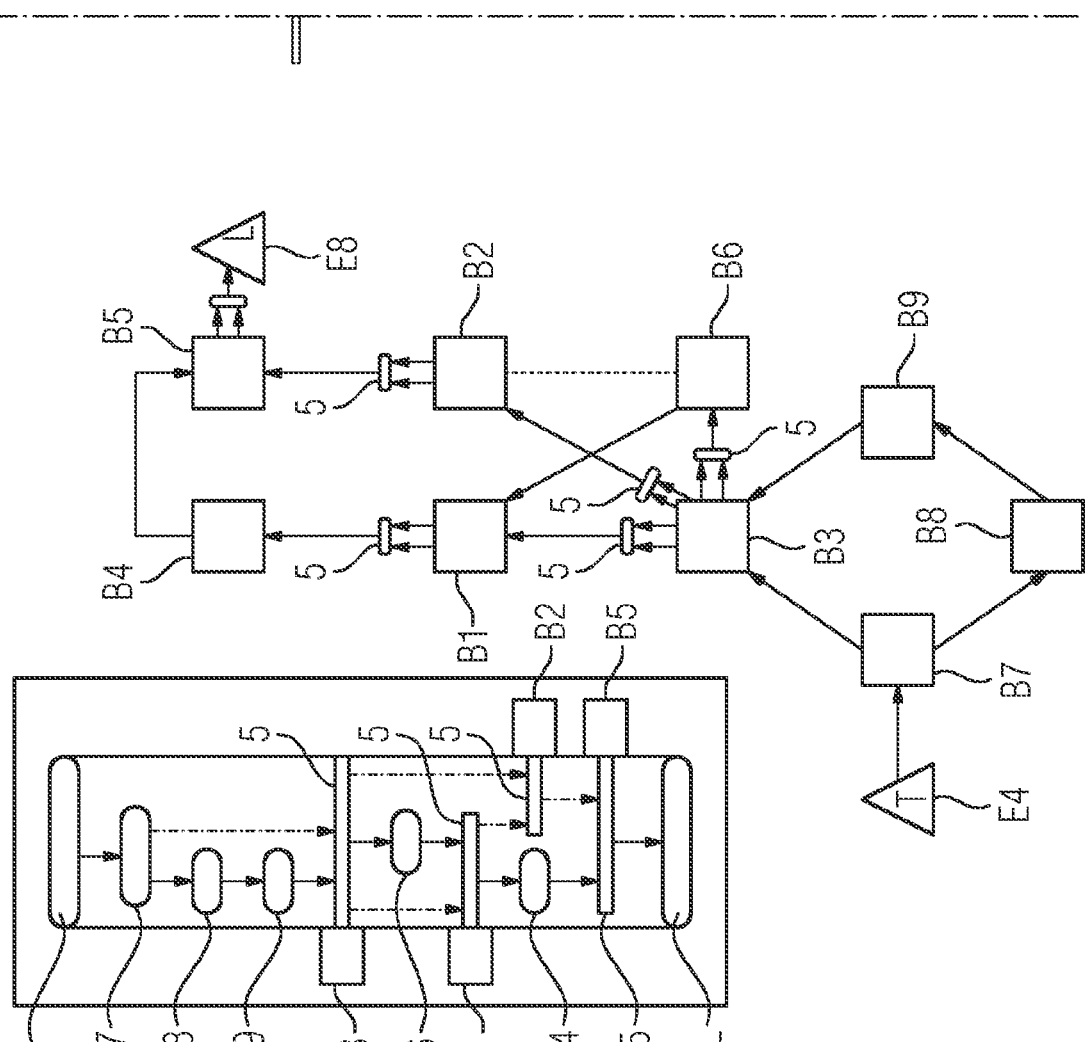

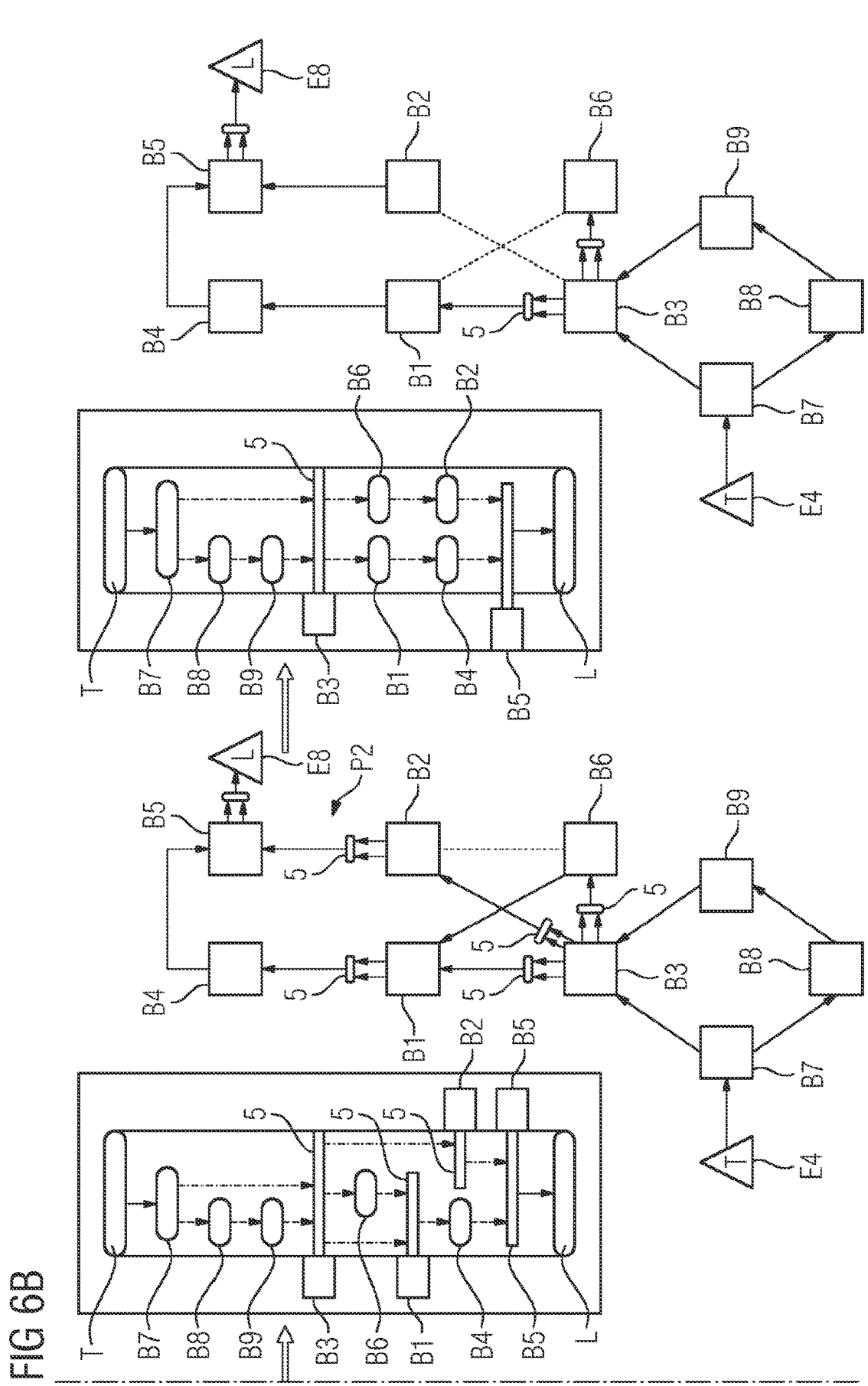

NETWORK NODE, COMPUTER PROGRAM, COMPUTER-READABLE MEDIUM AND METHOD FOR FAIL-SAFE DATA TRANSMISSION

CROSS-REFERENCE TO RELATED APPLICATION

This is a U.S. national stage of application No. PCT/EP2019/051604 filed 23 Jan. 2019.

BACKGROUND OF THE INVENTION

1. Field of the Invention

The invention relates to a network node, a computer program, a computer-readable medium and a method for fail-safe data transmission in a network, in particular an industrial network, having a plurality of network nodes.

2. Description of the Related Art

In industrial networks, sensor/actuator information is generally interchanged with the controller in a digitized manner via a communication network. A field bus is a bus system that connects field devices, such as measurement sensors (sensors) and actuating elements (actuators), to an automation device for the purpose of communication in an installation. If a plurality of communication participants transmit their messages via the same line, then it is necessary to stipulate who (identifier) says what (measured value, command) when (initiative). There are standardized protocols for this. Ethernet has become prevalent as the technology.

The field bus replaces the parallel bundles of lines with a single bus cable and connects all levels, from the field level to the control level. Irrespective of the type of automation device, for example, programmable logic controllers (PLC) from different manufacturers or PC-based controllers, the transmission medium of the field bus networks the components in the field.

The data to be transmitted are required for the automation task, where a loss of data should therefore be excluded. The destruction or failure of individual connecting sections should likewise not result in a break in communication.

A separate field bus technology has hitherto been developed in industry. The new Ethernet-based field buses with real-time capability are compiled, for example, in the International Electrotechnical Commission (IEC) 61784-2 standard. PROFINET (Process Field Network), the open industrial Ethernet standard of the PROFIBUS Nutzerorganisation e.V. (PNO), is known for automation. PROFINET uses Transmission Control Protocol/Internet Protocol (TCP/IP) and IT standards, has Ethernet capability and makes it possible to integrate field bus systems.

Pure data transmission in Ethernet does not provide any protection in the event of failure of a connection. A network becomes free of loops by virtue of IT protocols, for example, RSTP (by deactivating existing additional cables which are also referred to as links). There are further developments, for example ISIS SPB (SPB stands in this case for Shortest Path Bridging which is standardized in Institute of Electrical and Electronics Engineers (IEEE) 802.1aq; ISIS stands for the routing protocol "Intermediate System to Intermediate System Protocol" which is standardized, in particular, in International Organization for Standardization/International Electrotechnical Commission (ISO/IEC) 10589:2002(E)). Here, the further developments are based on the use of the respectively shortest connection between network nodes, for instance bridges, and the deactivation of additional links. However, in the two above-mentioned variants, there is a brief failure of communication in the event of a fault.

In the field of industry in particular, special redundancy mechanisms were introduced in order to be able to guarantee a deterministic switching time as easily as possible and to keep the failure low. In this case, recourse was had, for example, to the Media Redundancy Protocol (MRP) (see IEC 62439, in particular) that can compensate for individual failures in a simple ring topology.

In applications that do not cope with the failure of a connection, the data are generally transmitted on a plurality of, typically two, separate transmission paths (paths) in a parallel manner in the network. This is often referred to as "seamless redundancy" because there is no failure of communication in the event of a fault. The network protocol for Ethernet referred to as High-Availability Seamless Redundancy (HSR) and the Parallel Redundancy Protocol (PRP), which are both standardized in IEC 62439-3, are known, for example. A sequence number is inserted into all data packets in HSR and PRP.

At the IEEE, this principle is standardized by the Time-Sensitive Networking (TSN) task group within the scope of IEEE 802.1CB. An additional TAG (redundancy TAG) with a sequence number is inserted in a connection. As a result, duplicates can be transmitted in the network and subsequently filtered for particularly critical connections.

All of the previously known mechanisms are used only for operation and prevent a communication failure in the event of a fault on one of the two redundant paths. A possibly planned, in particular permanent, change to an existing network, such as on account of a conversion and/or an expansion, is not possible without problems. In the case of switching redundancy (also in the case of seamless redundancy) the result here may be a brief failure in communication. This has hitherto not been prevented. The cause of this is that, on account of a network change, a change in all (in the case of two) both redundant paths can occur. The redundant paths have hitherto been determined in ISIS SPB-PCR by the so-called GADAG. In this case, the acronym GADAG stands for Generalized Almost Directed Acyclic Graph. The Internet Engineering Task Force (IETF) project with the title "Algorithms for Computing Maximally Redundant Trees for IP/LDP Fast-Reroute", for example, discloses a method for an MRT fast-reroute algorithm which makes it possible to calculate GADAGs and to derive MRTs from the GADAGs.

A GADAG can be used as the basis for redundant paths in the network. When calculating paths, a path/route in the direction of the GADAG and a second path/route counter to the GADAG are usually found. However, if the GADAG changes, then the direction of the GADAG in a subsegment may change. Both paths/routes are then affected by this change. When switching from a previous GADAG to a new GADAG, the result may therefore be a simultaneous change on both paths that results in the failure of communication even when using a seamless redundancy method. A corresponding change may therefore be worse than a failure, for instance, a defect of an individual connection.

The Stream Reservation Protocol (SRP), IEEE 802.1Qat, with which transmission resources can be dynamically reserved and with which it becomes possible to guarantee latencies, is also known. The Time-Sensitive Networking (TSN) task group which emerged from the Audio Video Bridging (AVB) task group has worked and is working on a number of further standards. The TSN standards include, for example, time synchronization (IEEE 802.1AS-Rev), frame preemption (IEEE 802.1Qbu) and reservation (IEEE 802.1Qca, IEEE 802.1Qcc) and others.

WO 2019/001718 A1, which likewise traces back to the applicant, discloses a method for reserving maximally redundant transmission paths for transmitting data packets. This document discloses the practice of extending a reservation protocol such that the duplicate filters of seamless redundancy are automatically configured at the required locations in the network during resource reservation. All information is already known in the reservation protocol.

SUMMARY OF THE INVENTION

Proceeding from the prior art, it is therefore an object of the present invention to provide a network node and further develop the method of the type mentioned at the outset such that a particularly high degree of failure safety of communication, in particular even in the case of a change to the network, in particular the network topology is achieved.

This and other objects and advantages are achieved in accordance with the invention by a method for fail-safe data transmission in a network, in particular an industrial network, having a plurality of network nodes, in which data packets are transmitted from a transmitter to a receiver via at least two, preferably precisely two, redundant paths, on which resources for the transmission are reserved at involved network nodes using an identifier assigned to the respective path, in particular a VID assigned to the respective path, wherein, if a new path is to be found for at least one affected path, in particular on account of a change caused by a conversion and/or an expansion of the network, then the previous reservations on all redundant paths are retained, a new redundant path is determined for the at least one affected path and an attempt is made to reserve resources for the transmission on this path at the involved network nodes, wherein a new identifier which is assigned to the new path and differs from the previous identifiers is used, and if the new reservations on the at least one new path are successful, then the previous reservations on the at least one affected previous path are removed and, in particular, the transmission of data packets via the at least one affected previous path is terminated.

In other words, the basic concept of the present invention involves providing increased failure safety even in the event of changes, in particular network topology changes, by additionally setting up new reservations and specifically removing existing reservations only when the new reservations have been successful. Here, new, different identifiers are used in accordance with the invention for the new redundant paths/routes. The identifiers may be, for example, VLAN IDs, which are also referred to as VIDs for short.

Since, in accordance with the invention, there is simply no direct changing to new paths, but rather existing reservations on existing paths are initially deliberately not changed, but rather are maintained and expediently, if possible, used to forward packets or frames, interruption-free communication can be ensured even in that case in which all of two or more existing redundant paths are affected by a change. In particular, at least one of the previous paths can then continue to be used for protected real-time communication, in particular with guaranteed latency, in any case until one or more new paths can be found and resources can be successfully reserved on these paths.

Particularly in networks in which CB (IEEE 802.1CB) is supported only by some network nodes, it is particularly expedient to consider the resources separately for both variants. If paths are intended to run differently than existing reservations, then the result may be duplicates in network nodes that do not support CB and accordingly must send all duplicates of this connection.

As a result of the use in accordance with the invention of different identifiers, in particular VIDs, for the "old" paths and the "new" path(s), the data may be distinguished during forwarding. In the case of multiple assignments, only the reservation for the first arriving packet is effected in network nodes, for instance bridges, with CB. In the case of CB, the first arriving duplicate/packet is generally forwarded and all further, subsequently arriving duplicates are detected and filtered by the CB mechanism, i.e., are not forwarded and therefore do not constitute a multiple assignment on a common forwarding path. As a result of the reservation for the first arriving packet, no more resources than absolutely necessary are therefore also reserved.

The procedure in accordance with the invention makes it possible to reconfigure connections with seamless redundancy. An industrial installation that uses a network to transmit data need no longer be stopped, for example, if there is a planned optimization in the network. The use of seamless redundancy, in particular CB, in combination with the sequence in accordance with the invention of changing the reservations in the network, enables an interruption-free path change.

A change to the network may be caused or given, for example, by an expansion and/or optimization and/or conversion and/or repair on account of a fault or defect. The change is, in particular, a permanent change, in particular to the network topology.

It may be the case that a plurality of, in particular all, previous paths are affected by a change. In such a case, a new path is respectively preferably calculated for a plurality of, in particular all, affected paths and an attempt is made to make reservations with respective new identifiers on each new path, where, in particular, the new identifiers of all new paths differ from one another and from the previous identifiers. This ensures that data that are transmitted on all previous paths and on all new paths can be reliably distinguished from one another.

The identifiers, in particular VIDs, which belong to the two or more redundant paths of a transmission or connection preferably belong to a common base identifier, in particular a common base VLAN or base VID, or are included therein.

The identifiers that are assigned to the at least two redundant paths expediently differ from one another, i.e., the same identifier is expediently not used for the at least two redundant paths. This preferably applies both to the previous redundant paths and to the new redundant paths.

A path should be understood as meaning, in particular, in a manner known per se, a transmission path from a transmitter to a receiver.

In accordance with a further particularly preferred embodiment, a new generalized almost directed acyclic graph (GADAG) is calculated for the network or at least one part of the network, in particular in response to the change, and the at least one new path is calculated for the at least one affected previous path using the new GADAG. If a plurality of, possibly all, previous paths are affected by a change and a new path must accordingly be respectively calculated for a plurality of, possibly all, previous paths, then it is preferably true that all new paths are determined using the new GADAG.

The determination or calculation of the (new) GADAG, i.e., in particular the GADAG update, is preferably triggered manually. This can be implemented via a network management system, for example, after completion of a repair or planned optimization by a network administrator. The manual triggering or activation of the recalculation, i.e., the update, is particularly expedient to be able to distinguish in a specific manner between a planned expansion of the network or the completion of repair work, for instance, and the failure caused by a fault.

It will predominantly be the case that, in order to ensure seamless redundancy on precisely two redundant paths, data packets and duplicates are transmitted simultaneously to be able to pick up the failure of a defect on a path without interruption. Provision may then be made, in particular, for precisely two existing previous paths to change on account of a change in the network and for a new path to be respectively calculated for these two paths, which is then preferably performed using a new GADAG.

Furthermore, if a plurality of, in particular all, paths are affected by the change, provision may be made, of the new paths determined, for at least one path to point in the direction of the new GADAG and for at least one path to point in the opposite direction. If only one of the previous paths is affected by a change, it is preferably true that, of the one new path and the unaffected retained previous path(s), at least one path points in the direction of the new GADAG and at least one path points in the opposite direction.

Furthermore, provision may preferably be made for the new GADAG to be communicated to the involved network nodes. This can be performed, for example, in the form of or as part of messages that are distributed in the network, in particular interchanged between network nodes, by processing a protocol, in particular a routing protocol. The ISIS protocol shall be mentioned as an example of a routing protocol, where the ISIS-SPB/PCR protocol is particularly preferably used.

It should be noted that the situation in which the involved network nodes do not interchange the corresponding information, in particular a new GADAG, with one another, but rather each receive the information from a central location, is not excluded. Information can naturally also be received from a central location in combination with the information being interchanged by the network nodes.

In a further embodiment, the at least two previous paths are calculated using a previous generalized almost directed acyclic graph (previous GADAG). If this is the case, it is preferably true that at least one of the previous paths pointed or points in the direction of the previous GADAG and at least one other path of the previous paths pointed or points in the opposite direction. For the particularly customary situation in which precisely two previous redundant paths are or were provided, one of the two paths points in the direction of the previous GADAG and the other points in the opposite direction, in particular.

It should be noted that it is conventional to assign the color blue to a path that points in the direction of a GADAG and to assign the color red to a path that points in the opposite direction.

If precisely two new redundant paths need to be determined for precisely two (previous) redundant paths within the scope of the method in accordance with the invention, the colors of light blue and light red can be assigned in a similar manner to the two new redundant paths, where it is then true, in particular, that the light blue path points in the direction of the new GADAG and the light red path points in the opposite direction.

It is generally true that a recalculation results in a new GADAG, from which the two new paths are then formed. Accordingly, it can be stated that both paths are "updated".

However, it may be the case here that one part leads to the same result (path remains the same—part of the GADAG is retained without change for the new topology).

It is also true that the redundant trees required for seamless redundancy, for example, according to IEEE 802.1Qca, are explicitly predefined and/or can be locally calculated in the network nodes, for instance, bridges.

In order to calculate the paths, it is also possible to use topology discovery and/or distributed path computing, in particular spanning tree, shortest path (in particular for each boundary node, as in IEEE 802.1Q SPB-V for each SPT bridge with the SPVID) and/or maximally redundant trees (MRT), in particular based on a GADAG.

In a further preferred embodiment, after removing the previous reservations on the at least one affected previous path, provision may be made for further reservations of resources to be made at the involved network nodes on the at least one (respectively) associated new path using the previous identifier of the associated at least one previous path, and for the reservations for the new identifier to then be removed or cleared again. It thus becomes possible to change back to the previous original identifiers, in particular VIDs, for the new path(s), which has proved to be particularly suitable.

The changeover to one or more new paths for seamless redundancy with the preservation in accordance with the invention of the old reservations and their removal only after successful reservations on the new path(s) is particularly preferably performed in a completely transparent manner from the point of view of the involved terminals or for an associated application. As a result of the mechanisms for changing the identifier of a path in the network for the reservation that are defined in the reservation for CB, the internal identifiers used in the network are not visible to the terminals when using a special identifier for terminals—the identifier in the network is therefore changed in a transparent manner for the terminals.

When reserving resources along the (previous and new) path(s), the involved network nodes are (were) configured, in particular, where an identifier, for instance a VID, is/was preferably used, preferably is/was stored in the respective network node. The resources are reserved for the respective stream, in particular under or for the identifier.

A stream reservation protocol is preferably used to reserve resources at involved network nodes within the scope of the method in accordance with the invention. SRP and RAP are mentioned as an example of such a protocol. In this case, SRP stands for the Stream Reservation Protocol, preferably according to IEEE 802.1Q. The acronym RAP stands for Resource Allocation Protocol which is, in particular, the Resource Allocation Protocol according to the draft P802.1Qdd. LRP stands for Link-local Registration Protocol, in particular according to IEEE P802.1CS.

The reservation protocol used is preferably extended such that it performs, preferably in an automated manner, at those network nodes at which this is required, a configuration for seamless redundancy, in particular an automatic configuration of the duplicate filters for seamless redundancy at the required locations in the network while reserving resources. All information is already known in the resource reservation protocol previously known from the prior art.

In order to reserve resources at the involved network nodes on the at least one new path, a preferably standard advertisement message can be transmitted, for example, from the network node closest to the transmitter, in response to the change, to the network nodes that are next in the direction of the receiver on the at least one new path. An advertisement message may be, in particular, a so-called talker advertise, as is previously known from the prior art.

Provision may be made, in particular, for a plurality of new paths to be determined and, in order to reserve resources at the involved network nodes on the new paths, for a preferably standard advertisement message to be transmitted from the network node closest to the transmitter, in response to the change, to the network nodes that are next in the direction of the receiver on each new path.

Furthermore, in order to reserve resources at the involved network nodes on the at least one new path, a preferably standard participation message, in particular a listener ready, can be transmitted from the network node closest to the receiver to the network nodes that are next in the direction of the transmitter on the at least one new path. If a plurality of new paths are determined, in order to reserve resources at the involved network nodes on the plurality of new paths, a preferably standard participation message, in particular a listener ready, can be transmitted from the network node closest to the receiver to the network nodes that are next in the direction of the transmitter on each of the new paths.

In accordance with the disclosed embodiments, recourse is made to the previously known procedures for stream reservation and establishment, which has proved to be particularly suitable.

When forwarding the participation message, the CB functionality is preferably configured, in network nodes that are on a plurality of paths and support CB, for the paths with the respectively different identifiers and the participation message is transmitted on all paths in the direction of the network node closest to the transmitter. This is also described in WO 2019/001718 A1 which likewise traces back to the applicant.

The reservation of resources on the new path(s) within the scope of the method in accordance with the invention is preferably achieved or undertaken in the manner described in WO 2019/001718 A1, there in particular for obtaining for the first time more than one path with reserved resources at involved network nodes to ensure redundancy.

It is clear, inter alia, from WO 2019/001718 A1 that the connection-dependent configuration component of seamless redundancy can be effected via the protocol by virtue of the skilled combination of existing data from the reservation protocol and extension of rules when implementing the actual stream reservation. The extension is necessary in this case, in particular, only at the end points of the network (transitions to the terminal) or at redundant transitions (in particular ring-ring coupling locations). The reservation request is respectively implemented in this case at the input and output of the TSN network, in particular. The forwarding is performed in the network itself according to the standards.

According to WO 2019/001718 A1, provision is made, in particular, for both a stream advertisement message, in particular a talker advertise, and a stream participation message, in particular a listener join, to be forwarded to the boundary nodes at the talker and listener ends in a duplicated manner and via the plurality of, in particular both, redundant paths to be able to accordingly configure the nodes on all redundant paths and to be able to process the reservations.

The advantageous extension results in easier applicability of seamless redundancy for protected communication and enables use in low-configuration networks.

The procedures described in WO 2019/001718 A1 can also be implemented in a similar manner if one or more of the previous redundant paths change. In particular, duplicate filters can also be activated or set up, at least at the required locations in the network, in the manner described in WO 2019/001718 A1, in particular using an accordingly extended reservation protocol.

The stream data are forwarded in the network in a manner known per se based on the identification used for the stream in the stream data packets. Depending on the configured mode of CB, the stream data are forwarded with their respective own identifier, in particular their own VID, for each path or with a common identifier, in particular a common VID, on all paths which have previously been configured, in particular, by the reservation, in particular a talker advertise and listener join. Both variants are possible according to the mechanisms defined in the IEEE 802.1CB standard.

The network in which the data are transmitted may comprise at least a ring topology and/or at least a meshed topology.

The network is also expediently an AVB or TSN network or a network with AVB or TSN capability. In particular, the network nodes of the network have AVB or TSN capability, support one or more AVB or TSN standards, such as the reservation of resources for forwarding with guaranteed latency.

It should be understood it is possible to transmit data, as a stream, from one transmitter to more than one receiver and/or to transmit data from a plurality of transmitters to one receiver using reserved resources at the involved network nodes. Here, a pair consisting of one transmitter and one receiver should then be respectively considered, for which two or more (previous) redundant paths then exist, and, if at least one of the redundant paths belonging to the pair is affected by a change, at least one new path is determined for each pair of transmitter and receiver and an attempt is made to reserve resources on said path.

It is also an object of the invention to provide a network node having a processor and memory, which is configured to implement the method in accordance with disclosed embodiments of the invention. A network node, which can also be referred to as a network element, may be form as a bridge or switch, for example.

The network node in accordance with the invention is preferably configured such that it can make the reservation. Provision may also be made for the network node according to the invention to be configured such—that it defines the paths in the network. This has proved to be expedient, in particular, if the network node is intended (to be able) to function in a network as a boundary node that is closest to a transmitter (talker) or receiver (listener), in particular a terminal representing such. The paths should preferably be defined by a boundary node at the transmitter end or are defined by a boundary node at the transmitter end if a stream is to be set up between precisely one transmitter and one or more receivers, and are defined by a boundary node at the receiver end if a stream is to be set up between a plurality of transmitters and precisely one receiver.

The network node in accordance with the invention has proved to be particularly suitable for performing the method in accordance with the disclosed embodiments of the invention.

It is also an object of the invention to provide a computer program comprising program code for performing the steps of the method in accordance with the disclosed embodiments of the invention.

Finally, it is also an object of the invention to provide a computer-readable medium comprising instructions which, when executed by a processor on at least one computer, cause the at least one computer to perform the steps of the method in accordance with the disclosed embodiments of the invention.

The computer-readable medium may be, for example, a CD-ROM or DVD or a USB or flash memory. It should be noted that a computer-readable medium is not intended to be understood as meaning solely a physical medium, but rather such a medium may also be present, for example, in the form of a data stream and/or a signal representing a data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention become clear on the basis of the following description of embodiments according to the invention with reference to the accompanying drawing, in which:

FIG. 6 is three further purely schematic illustrations of the network of FIG. 1 only with the two terminals of FIG. 4, where the forwarding of data for the case of only one identifier is indicated using arrows for three different cases (on the left, in the center, on the right)

DETAILED DESCRIPTION OF THE EXEMPLARY EMBODIMENTS

Figure 1:
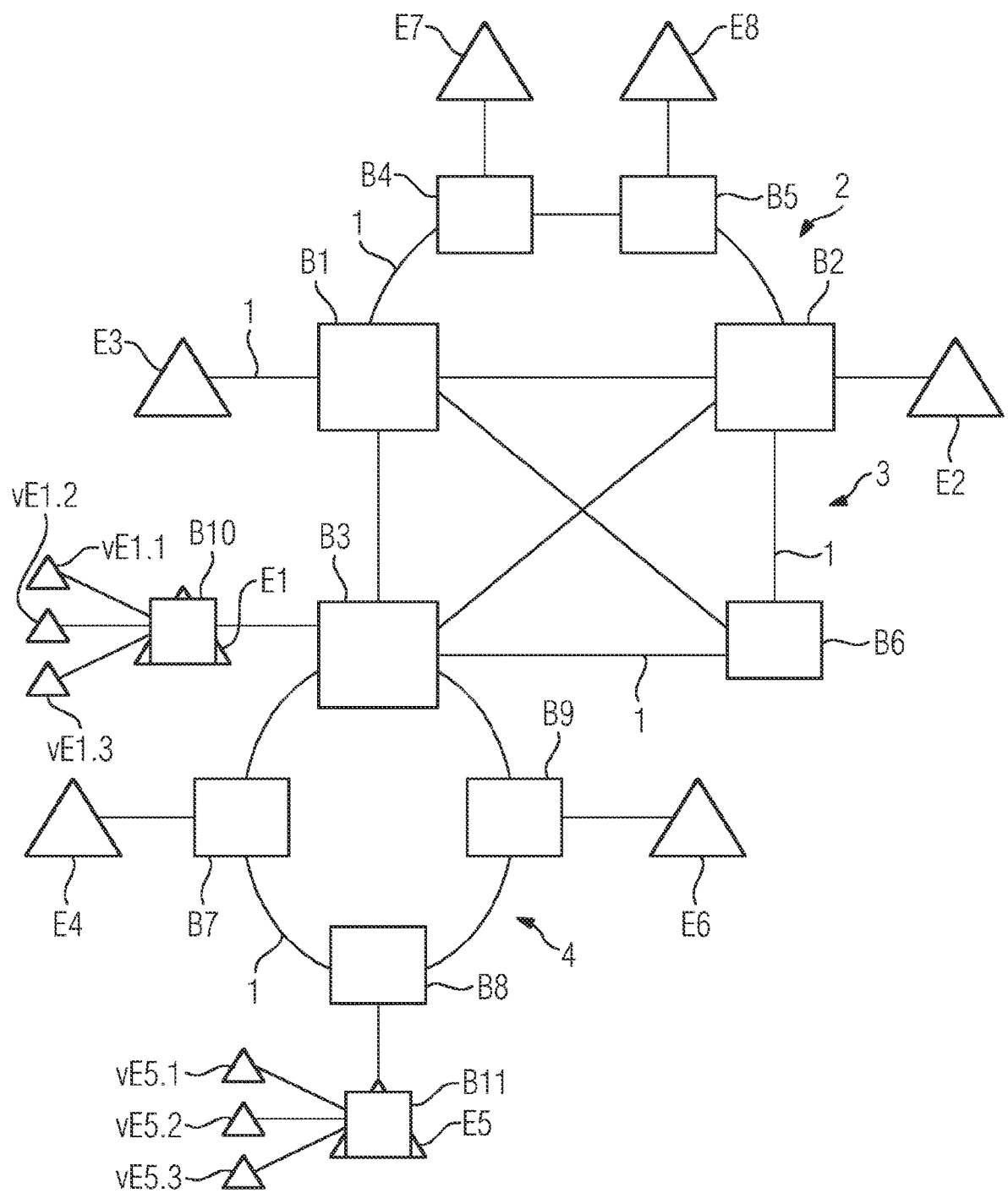
FIG. 1 is a purely schematic illustration of an industrial TSN network having a plurality of network nodes, in which a plurality of terminals participate in accordance with the invention.

In a purely schematic illustration, FIG. 1 shows an industrial Ethernet-based network having a plurality of network nodes in the form of bridges B1-B9. The network is a TSN network and all network nodes B1-B9 support TSN standards, in particular the reservation of network resources for real-time data transmission with guaranteed latency.

The network nodes B1-B9 are connected to one another via cables 1, which can also be referred to as links. Here, the result is three subregions 2, 3, 4 with different network topologies, specifically a first, upper region 2 with a garland-like topology, a second, central region 3 with a meshed topology and a third, lower region 4 with a ring topology.

The garland topology is suitable, in particular, for cost-sensitive field-level networks or segments for actuators and sensors and is generally redundantly connected to meshed networks, as illustrated by way of example in FIG. 1.

Meshed networks or segments are suitable, in particular, for centralized computing power (for instance, virtual machines in terminals) in the field of industrial automation, which can support seamless "hot plug-in", i.e., the replacement of components during operation of the network, for time-sensitive streams. This can be combined, in particular, with high-availability networks and the support of topology changes by adding or removing bridges or links.

Ring topologies are likewise suitable, in particular, for cost-sensitive field-level networks or segments for actuators and sensors, which can be connected to a meshed network or segment.

A total of eight terminals E1-E8 are connected to the network according to FIG. 1, where, as can be seen, the terminal E1 is at the node B3, the terminal E2 is at the node B2, the terminal E3 is at the node B1, the terminal E4 is at the node B7, the terminal E5 is at the node B8, the terminal E6 is at the node B9, the terminal E7 is at the node B4 and terminal E8 is at the node B5.

Virtualizations run on the terminals E1 and E5 that are industrial PCs, where an internal virtual bridge B10 and B11 is respectively implemented on these E1 and E5, respectively, and three virtualized applications vE1.1, vE1.2, vE1.3 (terminal E1) and vE5.1, vE5.2, vE5.3 (terminal E5) are respectively present on each of the two virtual bridges B10, B11.

The further terminals are, in particular, programmable logic controllers, I/O devices that each comprise or are connected to actuators and/or sensors, HMI panels for input by users or operators, and display apparatuses for display, as can be understood purely by way of example.

Specifically, in the present case, the terminal E4 is, for example, a programmable logic controller that forms a data source or a transmitter and from which data packets are to be transmitted to the terminal E8 that is an I/O device here. The I/O device E8 comprises or is connected to actuators that are to be used to act on an industrial process not illustrated in the figures. The actuators must cyclically receive actuating values in a manner known per se, with the result that data packets containing appropriate useful data content must be cyclically transmitted from the terminal E4 to the terminal E8.

In order to ensure secure transmission of the data packets, in particular with guaranteed latency, transmission resources need to be reserved or are reserved for the transmission at involved network nodes B1-B9, as is previously sufficiently well-known from the prior art, inter alia, various TSN standards. The data packets periodically transmitted using reserved resources can also be referred to as a stream or TSN stream.

According to AVB and TSN, it is conventional to refer to the transmitter or the data source as a talker and to refer to the receiver or the data sink or the data destination as a listener. Accordingly, the terminal E4 for the stream to the terminal E8 is the talker and the terminal E8 is the listener.

An interruption in communication would be associated with a failure of a link 1 or of a network node B1-B9, for example, which would be associated with considerable problems for the industrial technical process or an associated installation. Accordingly, it is a known practice to provide redundant data transmission.

In the industrial sector in which a particularly high degree of failure safety is required, the so-called seamless redundancy has proved to be suitable, in particular. According to this, data packets are simultaneously transmitted on two paths, in particular maximally redundant paths. For this purpose, duplication and duplicate filtering are performed at necessary locations in the network, in particular at some of the network nodes B1-B9. In connection with seamless redundancy, reference shall also be made to the "Frame Replication and Elimination for Reliability", in particular according to IEEE 802.1CB.

In order to be able to find two paths or trees, in particular redundant paths or trees, in a network of a given topology, it is a known practice to determine a GADAG and to determine two paths or trees, in particular maximally redundant paths or trees (MRT), on the basis of this GADAG.

Figure 2:
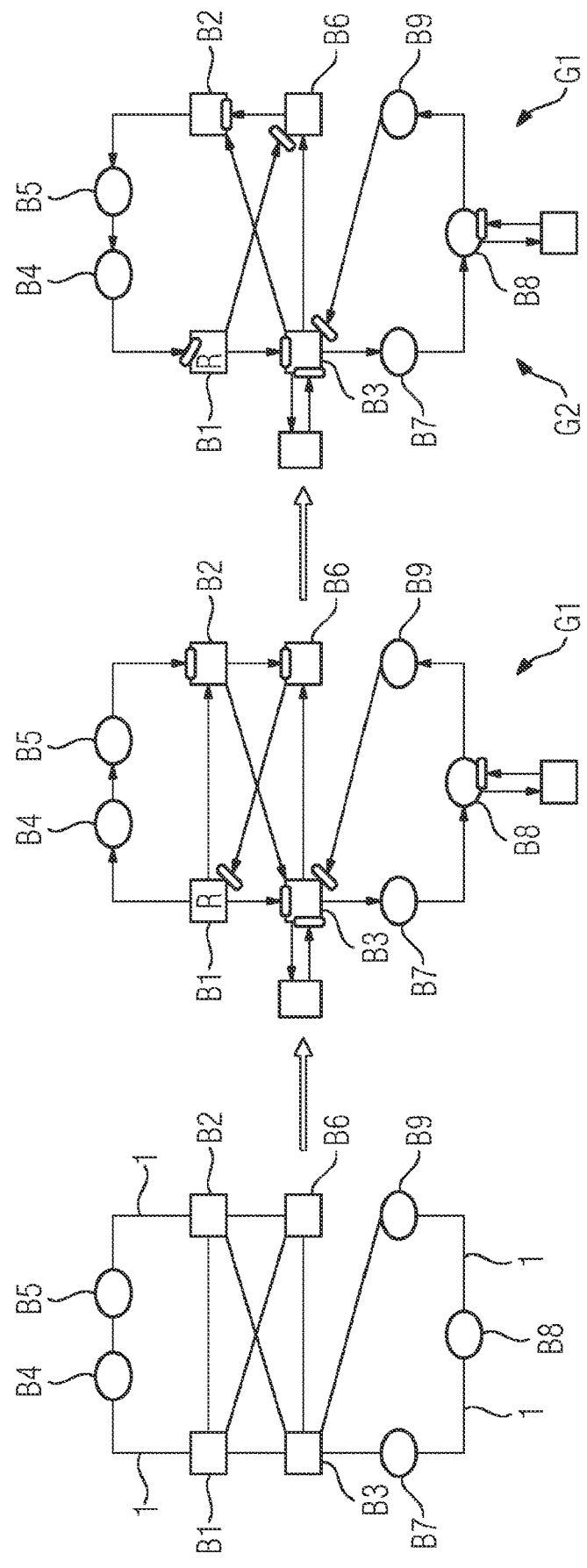
FIG. 2 is three purely schematic illustrations of the network of FIG. 1, where only the network nodes and the connections of the latter are visualized via lines (on the left) and a GADAG calculated for the network is visualized via arrows connecting the nodes (in the center) and a new GADAG changed on account of the loss of a connection is visualized via arrows connecting the nodes (on the right)

For the network illustrated in FIG. 1, assuming that the bridge B1 is the root, the result is a GADAG G1, as represented by corresponding arrows in FIG. 2. It should be noted that only the nodes B1-B9 of the network of FIG. 1 and the associated connections 1 are again represented by corresponding lines on the left in FIG. 2. It should also be noted that the bars at some ends of the arrows in the center of FIG. 2 each represent the end of a "ear" (according to IEEE 802.1Q) of the GADAG G1. The GADAG G1 illustrated is the result of the calculation from IEEE 802.1Q according to the algorithm mentioned therein from the IETF RFC 7811—"An Algorithm for Computing IP/LDP Fast Reroute Using Maximally Redundant Trees (MRT-FRR)".

Figure 3:
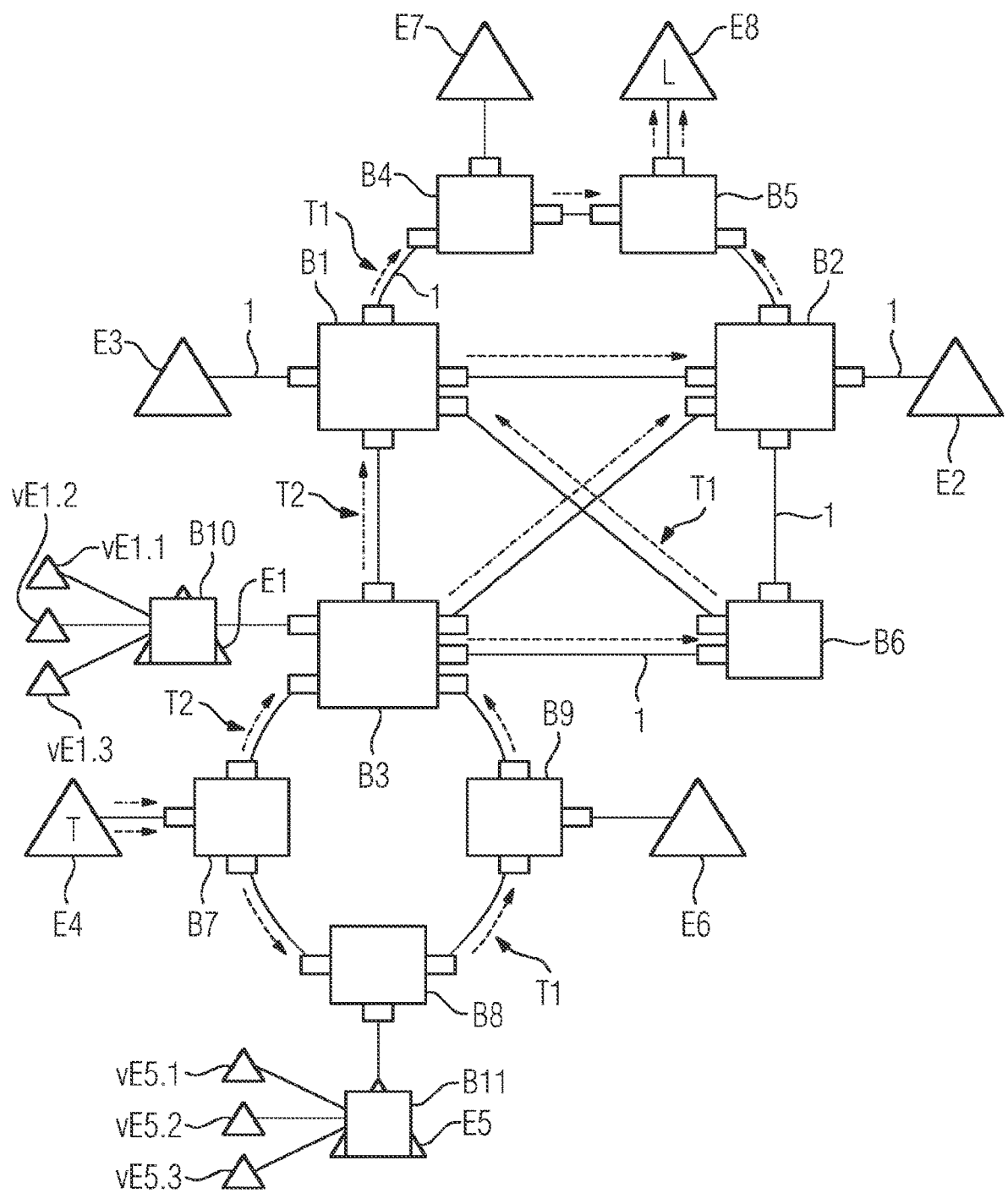
FIG. 3 is a further purely schematic illustration of the network of FIG. 1, where the connections are represented by lines and two redundant trees, which connect two of the terminals to one another and are based on the GADAG of FIG. 2 in the center, are represented by arrows.

FIG. 3 likewise shows the network of FIG. 1, where the terminal E4 is marked as the talker by the letter "T" and the terminal E8 is marked as the listener by "L", and the two maximally redundant paths P1, P2 or trees T1, T2 from the talker E4 to the listener E8, which result from the GADAG G1 according to the center of FIG. 2, are represented by arrows in addition to the connections 1. Here, one tree T1 is represented by arrows with a dashed line and the second tree T2 is represented by arrows with a dash-dotted line. As evident, the tree T1 points in the direction of the GADAG G1 (cf. the dashed arrows from FIG. 3 with the arrows from the center of FIG. 2) and the tree T2 points in a direction opposite the GADAG G1 (cf. the arrows with a dash-dotted line from FIG. 3 with the arrows from the center of FIG. 2). It should be noted that the ports of the network nodes B1 to B9 are also schematically indicated in FIG. 3.

It should also be noted that it is conventional, in particular according to IEEE 802.1Q, to indicate trees pointing in the direction of a GADAG using the color blue and to indicate trees pointing contrary to the GADAG using the color red. In the present case, the dashed arrows of T1 therefore correspond to the blue tree according to the convention and the dash-dotted arrows of T2 correspond to the red tree according to the convention.

The trees T1, T2 and therefore paths P1, P2 have been calculated by each of the nodes B1-B9 using the GADAG G1 by using the GADAG G1 once in its direction and once in the opposite direction to calculate the paths starting from the bridge B7 as the source for the forwarding path to be calculated. In order to be available to the nodes B1 to B9, the GADAG G1 was distributed in the network, specifically communicated to the nodes B1 to B9, after being determined, using ISIS-SPB/PCR within the scope of the exemplary embodiment described here. It should be understood the situation in which a tree or path is calculated at a central location, rather than locally by the nodes B1-B9, is not excluded either. The GADAG calculation can also be performed locally in a distributed manner by the nodes B1 to B9 instead of at a central location.

Figure 4:
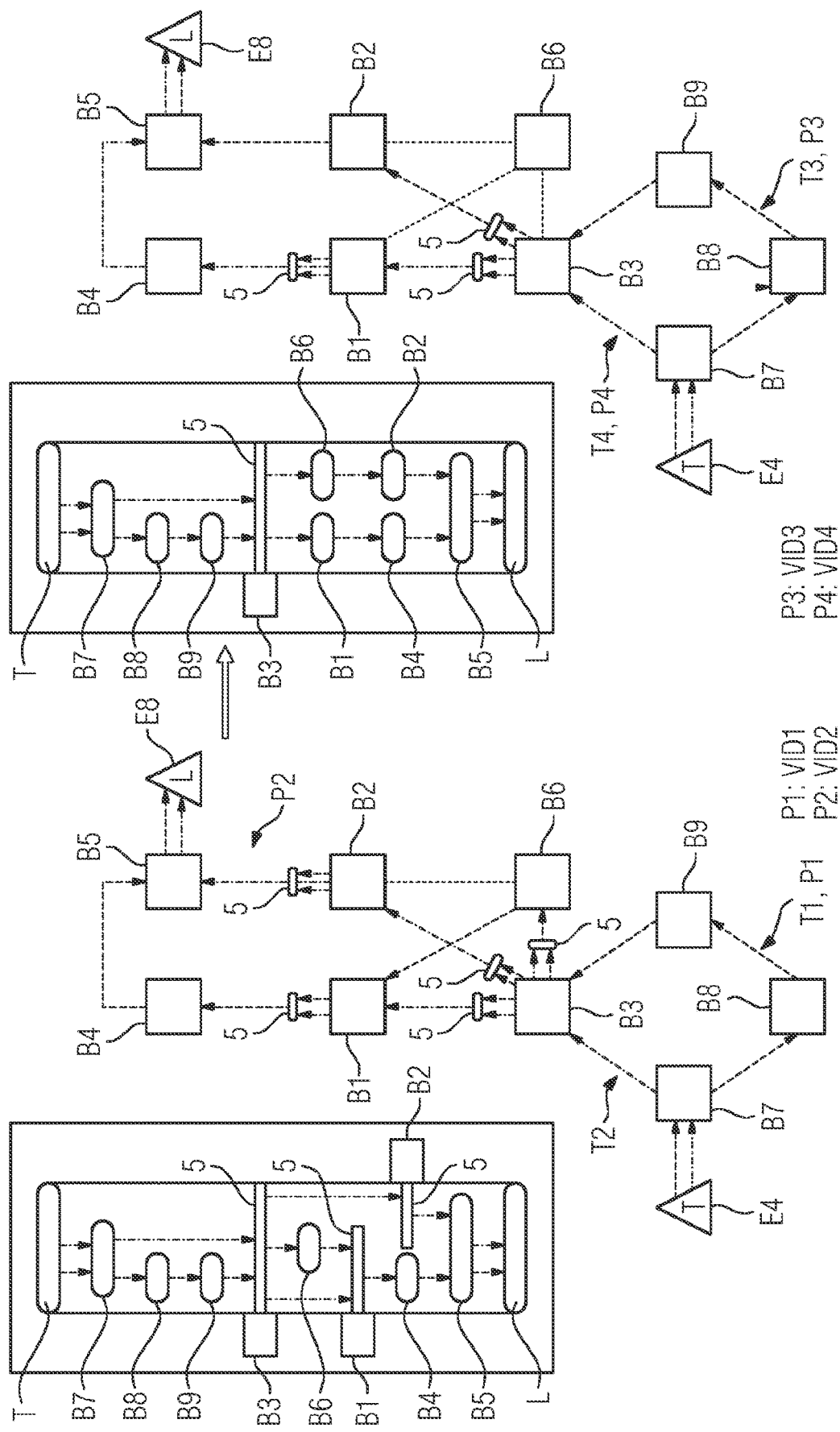
FIG. 4 is two further purely schematic illustrations of the network of FIG. 1, where only the two terminals connected by the redundant trees in FIG. 3 and again the trees from FIG. 3 (on the left) and two new redundant trees, which are based on the GADAG of FIG. 2 on the right, are shown.

The networks of FIGS. 1, 2 and 3 is illustrated on the left in FIG. 4, where only the network nodes B1-B9 and two of the eight terminals E1-E8 are illustrated here, specifically only the talker E4 and the listener E8. The two maximally redundant trees T1 and T2 are also represented again using dashed or dash-dotted arrows, here without additionally illustrated connections 1. Illustrated beside the network in a purely schematic manner is the flow of data packets according to CB (IEEE 802.1CB) from the talker E4 to the listener E8. Both in the illustration of the network and in the schematic flow diagram, bars provided with the reference numeral 5 are used to illustrate the locations at which duplicates are filtered according to CB. Specifically, this is clearly the case at the network nodes B3, B1 and B2. The other network nodes B4 to B9 in the network need not support CB in the topology shown for the connection shown between the talker E4 and the listener E8.

As is also seen, data packets are simultaneously forwarded both via a redundant route or path P1, which corresponds to the tree T1, from the talker E4 to the listener E8 and via a second route or path, which constitutes part of the tree T2 and extends specifically from the talker E4 to the listener E8 via the nodes B7, B3, B2 and B5.

As a result of the simultaneous forwarding via two redundant paths P1, P2 (seamless redundancy), it is ensured that the necessary data reach the listener E8 even in that case in which there is a fault or failure of a network node B1-B9 or of a link 1 on one of the two redundant paths P1, P2.

A fault may occur for each GADAG ear (for example, the region or the segment 4) without the connection being severed or the transmission of data being interrupted.

In this case, resources have been reserved for secure transmission for both of the redundant paths P1, P2 at the involved network nodes (these are B7, B8, B9, B3, B6, B1, B4 and B5 for P1 and B7, B3, B2 and B5 for P2) using a reservation protocol, in particular according to RAP (Resource Allocation Protocol). The reservation of resources at the nodes B1-B9 for the two paths P1, P2 was specifically performed or achieved in the manner described in WO 2019/001718 A1 which likewise traces back to the applicant. The connection-dependent configuration component of seamless redundancy was effected, in particular, via the reservation protocol by virtue of skilled combination of existing data from the reservation protocol and extension of rules when carrying out the actual stream reservation. For the two redundant paths P1, P2 and the reservations at the nodes B1-B9 on these paths, two different identifiers, specifically different VIDs, were used in this case, a VID1 for the path P1 and a VID2 for the path P2. According to the manner described in WO 2019/001718 A1, a separate VID is used for each path during the reservation. In the network shown, the identification used in the reservation is likewise used in the packets with different VIDs for the two transmission paths P1 and P2 in order to transmit data. VID1 and VID2 belong to a common base VLAN or a common base VID.

The situation may occur in which an update or a new calculation of the GADAG is required or prompted on account of a change, such as a failure or loss of a connection or a network node.

In the present case, such a failure occurs, specifically the link 1 that connects the two network nodes B1 and B2 fails, which is respectively indicated in the figure by "..." which point from B1 in the direction of B2 and vice versa. The loss of this connection 1 also becomes particularly clear by comparing the left of FIG. 4 with the left of FIG. 2.

In the light of the loss of the link 1, an update of the GADAG is manually initiated. The manual activation of the update is particularly expedient to be able to distinguish in a specific manner between a planned expansion of the network or the completion of repair work, for instance, and the failure caused by a fault. The recalculation can be manually initiated after completing the work on the network, in particular by the network administrator or the service engineer, and can be initiated, for example, by using a network management system.

The new GADAG G2 resulting for the topology without the link 1 connecting the two nodes B1 and B2 is visualized on the right of FIG. 2, again via appropriate arrows. A comparison of the old, previous GADAG G1 illustrated in the center of FIG. 2 with the new GADAG G2 illustrated on the right of FIG. 2 shows that the direction of the GADAG has changed for some connections 1. Specifically, this is the case for the connection 1 between B3 and B2, between B1 and B6 and for the path from B1 to B2 via B4 and B5. As far as the connection 1 between B3 and B1 and the connections 1 in the ring segment 4 are concerned, the directions have remained the same.

It should be noted it is true for the new GADAG G2 that the result is a stream configuration that uses two rings with B3 as a coupling element. It is possible to compensate for one failure per ring. It should also be noted that a GADAG uses all nodes B1-B9 in the same way and is not aware of any distinction of segments. The "field segment" with B4 and B5 is now used for the redundancy of the entire meshed network and should no longer be considered as a separate line, in particular.

Both paths or trees are affected by these changes in the direction of the GADAG in the respective subsegment or subregion 2, 3, 4 of the network. The new trees T3, T4 and new paths P3, P4 that result on account of the new GADAG G2 according to the center of FIG. 2 can be gathered from the right of FIG. 4. Here, the new tree T3 pointing in the direction of the new GADAG G2 is again represented on the right of FIG. 4 by arrows with a dashed line and the new tree T4 pointing counter to the new GADAG G2 is again represented with arrows with a dash-dotted line. The new path P3 in the direction of the new GADAG G2 passes from the talker E4 to the listener E8 via B7, B8, B9, B3, B2 and B5, and the new path P4 counter to the new GADAG G2 passes from the talker E4 to the listener E8 via B7, B3, B1, B4 and B5.

Also illustrated in a purely schematic manner on the right of FIG. 4 beside the network is the flow of data packets according to CB (IEEE 802.1CB) from the talker E4 to the listener E8 according to the two new trees T3, T4 or paths P3, P4. Here, bars provided with the reference numeral 5 are also used, both in the illustration of the network and in the schematic flow diagram, to illustrate the locations at which duplicates are filtered according to CB. Specifically, this is clearly the case at the network node B3.

In the comparison of the left and right sides of FIG. 4, it becomes clear that both paths P3, P4 or trees T3, T4 have changed in comparison with the previous paths or trees P1, P2, T1, T2; specifically, only the region 3 in the form of a ring segment and the connection between B3 and B1 have remained the same.

Figure 5:
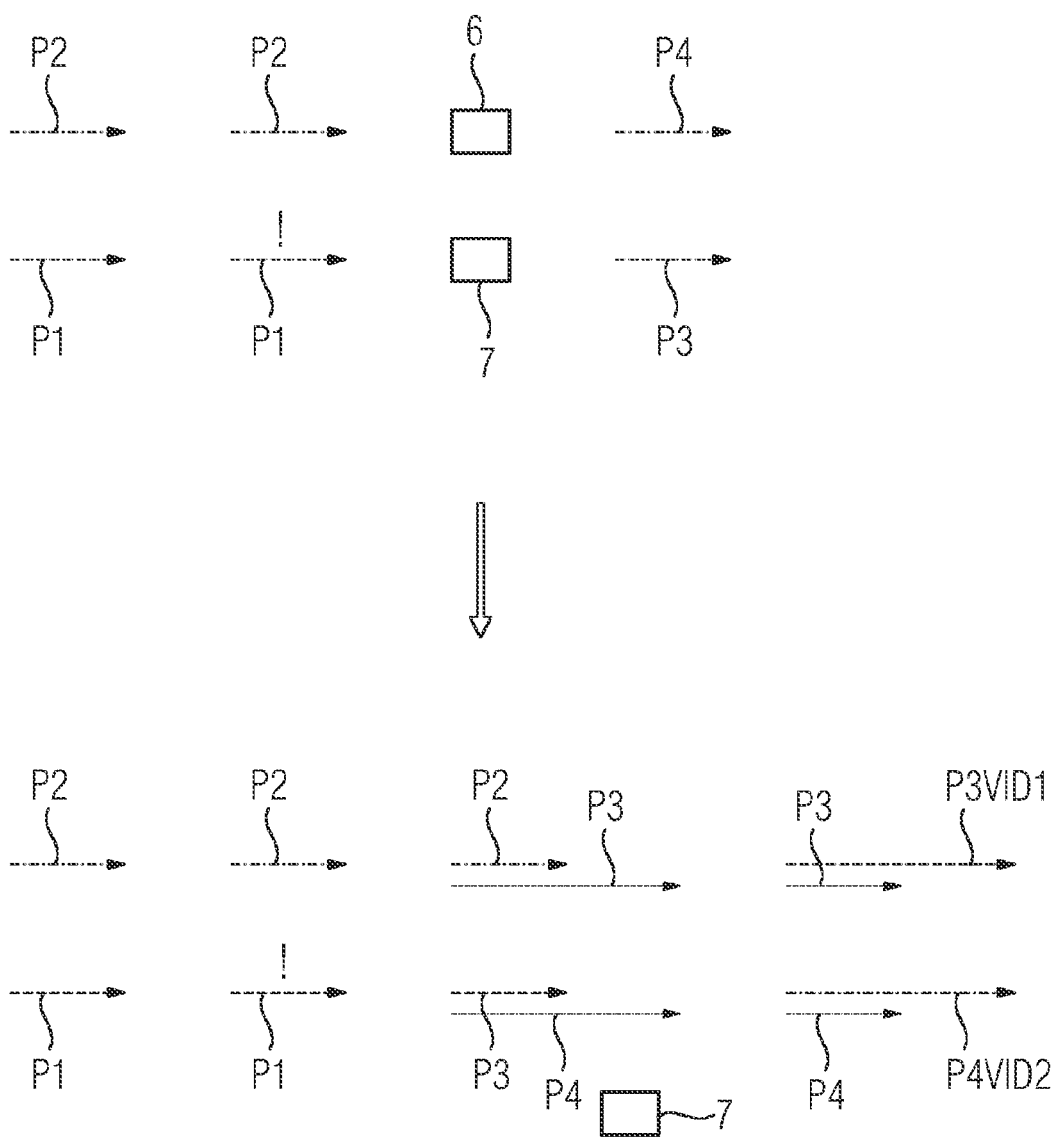
FIG. 5 is a purely schematic illustration of the reservation procedure.

The top of FIG. 5 illustrates the procedure in a highly simplified manner via arrows. Specifically, for a starting point (on the far left), there are two paths P1, P2, one of which points in the direction of the GADAG G1 and one of which points in the opposite direction. If a fault occurs on a path, P1 in the present case, which is indicated in FIG. 5 by an exclamation mark above the path P1, then there is an interruption or failure of communication (element provided with reference numeral 6) during the reconfiguration (element provided with reference numeral 7). The new paths P3, P4 are available only after some time and (in comparison with P1 and P2) both have changed direction. The same VIDs are used for the new, changed paths, specifically VID1 for P3 and VID2 for P4.

The procedure in accordance with disclosed embodiments of the invention can be used to reliably prevent an interruption in communication even in such a case when both redundant paths change on account of a change in the GADAG G1, G2.

In this regard, provision is made for the previous reservations of resources at the involved network nodes B1-B9 on the previous redundant paths T1, T2 to be deliberately retained and for an attempt to be made in a parallel manner to reserve resources for the data transmission from the talker E4 to the listener E8 on the new paths T3, T4 (see FIG. 4 on the right) at the involved network nodes B1-B9. Here, new identifiers, specifically VIDs, which differ from the previous identifiers of the previous paths P1, P2, i.e., VID1 and VID2, are used in accordance with the invention for the two new paths P3, P4.

Specifically, a VID3 is used for the new path P3 and a VID4 is used for the new path VID4.

It should be noted that, in analogy to the colors of blue and red, the colors of light blue and light red can be assigned to both new paths P3, P4 or to the new identifiers VID3, VID4 assigned to the latter, in which case it is true that the new light blue path P3 points in the direction of the new GADAG G2 and the new light red path P4 points in the opposite direction.

The reservations of resources at involved network nodes B1-B9 on the two new redundant paths P3, P4 is achieved in this case in the manner described in WO 2019/001718 A1 which likewise traces back to the applicant. Specifically, an advertise for the new paths is distributed in the network by the bridge B7 if the paths are updated. The bridge B5 copies the received listener applications for the new GADAG G2 to the new VIDs and distributes them in the network. This produces a new reservation that exists with the existing reservations for the GADAG G1 on VID1 and VID2. Following successful reservation, the bridge B7 can then delete the existing reservations for VID1 and VID2. In order to retain the original VIDs, the bridge B7 can repeat the stream notification (in particular talker advertise) on the previously used VIDs (VID1 and VID2) for the GADAG G2.

The previous reservations on the previous paths T1, T2 are removed and, in particular, the transmission of data packets via the two previous paths T1, T2 is stopped only if the new reservations on the new paths P3, P4 are successful.

For forwarding the data packets, it is true, in particular, that the boundary node at the transmitter end, i.e., B7, adds the VID3 and the VID4 in arriving data packets so that the resources reserved for these identifiers are respectively used at the transmission ports in the bridges along the respective path. The bridge B5 still uses the VID1 and the VID2 for the arriving data packets. The terminals and an application running on the latter do not notice anything of this. There is therefore transparency.

The previous reservations are deliberately maintained, until resources were able to be successfully reserved again on all changed, new paths P3, P4. As a result, at least one transmission path with secure resources is available at all times.

Following the successful establishment of the reservations on the two new paths P3, P4 and, in particular, following the removal of the reservations on the previous paths P1, P2, it is possible to change the new VIDs, i.e., VID3 and VID4, back to the old, previous VIDs, ki.e., VID1 and VID2. This is presently the case. Specifically, the VID of the new path P3, i.e., VID3, is changed to the old VID of path P1, i.e., the VID1, and the VID of the new path P4, i.e., VID4, is changed to the old VID of P2, i.e., to VID2. As a result, the original configuration state is restored.

The bottom of FIG. 5 illustrates the procedure with the additional reservations on the new paths P3, P4, again in a highly simplified manner analogously to the top of FIG. 5. The two new paths, for which the previous, old identifiers are used again, are denoted therein using $P3_{VID1}$ and $P4_{VID2}$.

As an alternative or in addition to changing back to the original VIDs, the new VIDs, i.e., VID3 and VID4, can also remain. Here, the boundary node at the receiver end, i.e., B5, in particular, will change the VID3 in arriving data packets to VID1 and will change the VID4 to VID2 so that there is full transparency for the terminals and the application on the latter.

As an alternative to using different identifiers, in particular VIDs, when transmitting data, the same identifier, in particular the same VID, can also be used for all logical paths. This applies, in particular, when the mechanisms for duplicate filtering defined in IEEE 802.1CB are present or supported at each location in the network at which a plurality of identifiers meet. As a result, a change of the logical identifiers can be transparently seen by the actual data transmission. When setting up the additional reservation, only resources on the links to be newly used are reserved, where the resources on links that are no longer required for the new paths are then released. As a result of the logical separation with different identifiers in the control plane, i.e., for the reservation, the affiliation of the respective reservation to the path is retained.

FIG. 6 shows the procedure for the situation in which one identifier is used for data transmission (in the data plane). In a similar manner to FIG. 4, FIG. 6 shows the network and, beside the network, flow diagram boxes, here for three scenarios. The same elements are provided with the same reference signs. However, in contrast to FIG. 4, the procedure in the control plane is shown in the flow diagram boxes from FIG. 6, whereas the arrows in the network representations represent the flow of packets (data plane). FIG. 6 shows three situations. Specifically, the situation without a link failure is illustrated on the left, a link failure between the network nodes B1 and B2 (similar to FIG. 4 on the left) is illustrated in the center and the situation with a new GADAG G2 is illustrated on the right. Here, only one identifier, specifically one VID, is used for both paths for forwarding data. Consequently, FIG. 6 contains only one type of arrow, specifically only arrows with a solid line.

It should be noted that the network nodes B7 and B5 are each exemplary embodiments of network nodes in accordance with the invention which are configured to perform the above-described exemplary embodiments of the method in accordance with the invention.

Figure 7:
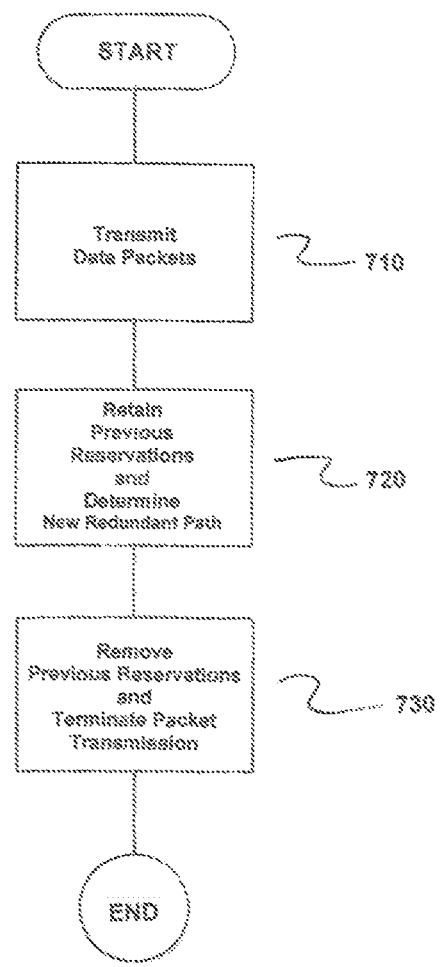
FIG. 7 is a flowchart of the method in accordance with the invention.

FIG. 7 is a flowchart of the method for fail-safe data transmission in a network having a plurality of network nodes B1-B9. The method comprises transmitting data packets from a transmitter E4 to a receiver E8 via at least two redundant paths P1, P2, upon which resources for the transmission are reserved at involved network nodes B1-B9 utilizing an identifier VID1, VID2 comprising a VID assigned to the respective path P1, P2, as indicated in step 710.

Next, previous reservations on all redundant paths P1, P2 are retained, determining a new redundant path P3, P4 for at least one affected path P1, P2 comprising at least one of (i) a change caused by a conversion and (ii) an expansion of the network is determined and an attempt to reserve resources for the transmission on this path at the involved network nodes B1-B9 if a new path P3, P4 is to be found for the at least one affected path P1, P2 comprising at least one of (i) the change caused by the conversion and (ii) the expansion of the network is performed, as indicated in step 720. In accordance with the invention, a new identifier VID3, VID4 assigned to the new path P3, P4 and differing from the previous identifiers VID1, VID2 is utilized.

Next, the previous reservations on the at least one affected previous path P1, P2 is removed and the transmission of data packets via the at least one affected previous path P1, P2 is terminated if the new reservations on the at least one new path P3, P4 are successful, as indicated in step 730.

Although the invention has been described and illustrated more specifically in detail by means of the preferred exemplary embodiment, the invention is not restricted by the disclosed examples and other variations can be derived therefrom by a person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for fail-safe data transmission in a network having a plurality of network nodes, the method comprising:
   transmitting data packets from a transmitter to a receiver via at least two redundant paths, upon which resources for the transmission are reserved at involved network nodes utilizing an identifier comprising a virtual ID (VID) assigned to a respective path;
   wherein, if a new path is to be found for at least one affected path comprising a change caused by at least one of (i) a conversion and (ii) an expansion of the network, the method further comprising:
      retaining previous reservations on all redundant paths;
      determining a new redundant path for at least one affected path and attempting to reserve resources for the transmission on this path at the involved network nodes, a new identifier assigned to the new path and differing from the previous identifiers being utilized; and removing the previous reservations on the at least one affected previous path and terminating the transmission of data packets via the at least one affected previous path if the new reservations on the at least one new path are successful; and wherein in order to reserve resources at the involved network nodes on the at least one new path, a standard advertisement message comprising a talker advertise, is transmitted from the network node closest to the transmitter, in response to the change, to the network nodes which are next in the direction of the receiver on the at least one new path comprising a plurality of new paths are determined; and wherein in order to reserve resources at the involved network nodes on the new paths, a standard advertisement message comprising a talker advertise, is transmitted from the network node closest to the transmitter, in response to the change, to the network nodes which are next in the direction of the receiver on each new path.

2. The method as claimed in claim 1, wherein a plurality of previous paths are affected by the change and a new redundant path is respectively calculated for the plurality of affected paths; and wherein the new identifiers of all new paths differ from one another and from the previous identifiers.

3. The method as claimed in claim 2, wherein all previous paths are affected by the change and a new redundant path is respectively calculated for the plurality of affected paths.

4. The method as claimed in claim 1, wherein a new generalized almost directed acyclic graph is calculated for the network or at least one part of the network; and wherein the at least one new path is calculated for the at least one affected previous path utilizing the new GADAG.

5. The method as claimed in claim 2, wherein a new generalized almost directed acyclic graph is calculated for the network or at least one part of the network; and wherein the at least one new path is calculated for the at least one affected previous path utilizing the new GADAG.

6. The method as claimed in claim 4, wherein one of (i) a plurality of paths are affected by the change and, of the new paths determined for said paths, at least one path points in the direction of the new GADAG and at least one path points in an opposite direction and (ii) only one of the previous paths is affected by the change and, of the one new path and the unaffected previous path(s), at least one path points in the direction of the new GADAG and at least one path points in the opposite direction.

7. The method as claimed in claim 6, wherein all paths are affected by the change.

8. The method as claimed in claim 4, wherein the new GADAG is communicated to the involved network nodes as part of messages which are distributed in the network by processing a routing protocol.

9. The method as claimed in claim 8, wherein the routing protocol comprises one of (i) the ISIS protocol and the ISIS-SPB/PCR protocol.

10. The method as claimed in claim 6, wherein the new GADAG is communicated to the involved network nodes as part of messages which are distributed in the network by processing a routing protocol.

11. The method as claimed in claim 10, wherein the routing protocol comprises one of (i) the ISIS protocol and the ISIS-SPB/PCR protocol.

12. The method as claimed in claim 1, wherein the at least two previous paths were calculated utilizing a previous generalized almost directed acyclic graph, a previous generalized almost directed acyclic graph; and wherein at least one of the previous paths pointed or points in the direction of the previous GADAG and at least one other path pointed or points in the opposite direction.

13. The method as claimed in claim 1, wherein after removing the previous reservations on the at least one affected previous path, further reservations of resources are made at the involved network nodes on the at least one new path utilizing the previous identifier, of the at least one previous path, and the reservations for the new identifier are then again removed.

14. The method as claimed in claim 1, wherein a stream reservation protocol comprising at least one of (i) SRP, (ii) RAP and LRP is utilized to reserve resources at the involved network nodes.

15. The method as claimed in claim 1, wherein in order to reserve resources at the involved network nodes on the at least one new path, a standard participation message comprising a listener ready, is transmitted from the network node closest to the receiver to the network nodes which are next in the direction of the transmitter on the at least one new path comprising a plurality of new paths are determined and, in order to reserve resources at the involved network nodes on the new paths, a standard participation message comprising a listener ready, is transmitted from the network node closest to the receiver to the network nodes that are next in the direction of the transmitter on each new path.

16. The method as claimed in claim 1, wherein the network comprises at least one of (i) at least a ring topology and (ii) at least a meshed topology.

17. The method as claimed in claim 1, wherein the network comprises an industrial network.

18. The method as claimed in claim 1, wherein the data packets are transmitted from a transmitter to a receiver via precisely two redundant paths.

19. A network node comprising:
a processor; and
memory;
wherein the network node is configured to:
transmit data packets are transmitted from a transmitter to a receiver via at least two redundant paths, upon which resources for the transmission are reserved at involved network nodes utilizing an identifier comprising a VID assigned to the respective path;

wherein, if a new path is to be found for at least one affected path comprising a change caused by at least one of (i) a conversion and (ii) an expansion of the network, the network node is further configured to:
retain previous reservations on all redundant paths;
determine a new redundant path for at least one affected path and attempt to reserve resources for the transmission on this path at the involved network nodes, a new identifier assigned to the new path and differing from the previous identifiers being utilized; and
remove the previous reservations on the at least one affected previous path and terminate the transmission of data packets via the at least one affected previous path if the new reservations on the at least one new path are successful;

wherein in order to reserve resources at the network node on the at least one new path, a standard advertisement message comprising a talker advertise, is transmitted from the network node, in response to the change, to network nodes which are next in the direction of the receiver on the at least one new path comprising a plurality of new determined paths; and wherein in order to reserve resources at the involved network nodes on the new paths, the standard advertisement message comprising the talker advertise, is transmitted from the network node, in response to the change, to the network nodes which are next in the direction of the receiver on each new path.

20. A non-transitory computer-readable medium encoded with program instructions which, when executed by a processor on at least one computer, cause the at least one computer to implement fail-safe data transmission in a network having a plurality of network nodes, the program instructions comprising:

program code for transmitting data packets from a transmitter to a receiver via at least two redundant paths, upon which resources for the transmission are reserved at involved network nodes utilizing an identifier comprising a VID assigned to the respective path;

wherein, if a new path is to be found for at least one affected path comprising a change caused by at least one of (i) a conversion and (ii) an expansion of the network, the program instruction further comprising:

program code for retaining previous reservations on all redundant paths;

determining a new redundant path for at least one affected path and attempting to reserve resources for the transmission on this path at the involved network nodes, a new identifier assigned to the new path and differing from the previous identifiers being utilized; and program code for removing the previous reservations on the at least one affected previous path and terminating the transmission of data packets via the at least one affected previous path if the new reservations on the at least one new path;

wherein in order to reserve resources at the involved network nodes on the at least one new path, a standard advertisement message comprising a talker advertise, is transmitted from the network node closest to the transmitter, in response to the change, to the network nodes which are next in the direction of the receiver on the at least one new path comprising a plurality of new determined paths; and wherein in order to reserve resources at the involved network nodes on the new paths, the standard advertisement message comprising the talker advertise, is transmitted from the network node closest to the transmitter, in response to the change, to the network nodes which are next in the direction of the receiver on each new path.

* * * * *